[19] United States Patent
Schuster

[11] 4,268,358
[45] May 19, 1981

[54] METHOD OF REDUCING THE SULFUR CONTENT OF COAL REDUCED TO DUST

[75] Inventor: Ernst Schuster, Gummersbach, Fed. Rep. of Germany

[73] Assignee: L. & C. Steinmüller GmbH, Gummersbach, Fed. Rep. of Germany

[21] Appl. No.: 79,093

[22] Filed: Sep. 26, 1979

Related U.S. Application Data

[63] Continuation of Ser. No. 866,479, Jan. 3, 1978, abandoned.

[30] Foreign Application Priority Data

Dec. 31, 1976 [DE] Fed. Rep. of Germany ....... 2659752

[51] Int. Cl.$^3$ .................... C01B 53/04; C10L 9/08; C10B 57/00
[52] U.S. Cl. ..................... 201/9; 44/1 SR; 48/210; 201/17; 201/31; 201/42
[58] Field of Search ................ 201/9, 15, 17, 31, 32, 201/42; 48/210; 44/1 R, 1 SR; 60/39.12, 39.18 R, 39.18 B

[56] References Cited

U.S. PATENT DOCUMENTS

| | | | |
|---|---|---|---|
| 1,937,552 | 12/1933 | Davis, Jr. | 60/39.12 UX |
| 2,706,706 | 4/1955 | Pettyjohn | 201/31 X |
| 3,254,976 | 6/1966 | Wolf et al. | 201/31 X |
| 3,535,209 | 10/1970 | Ledent | 201/31 X |
| 3,541,025 | 11/1970 | Oda et al. | 201/31 X |
| 3,759,673 | 9/1973 | Whitten et al. | 201/17 X |
| 3,991,557 | 11/1976 | Donath | 201/17 X |
| 4,002,535 | 1/1977 | Albright et al. | 201/31 X |
| 4,053,285 | 10/1977 | Robinson et al. | 44/1 R X |
| 4,054,421 | 10/1977 | Robinson et al. | 44/1 R X |
| 4,070,250 | 1/1978 | Choi | 48/210 X |

FOREIGN PATENT DOCUMENTS

| | | | |
|---|---|---|---|
| 854267 | 11/1960 | United Kingdom | 201/9 |
| 945308 | 12/1963 | United Kingdom | 201/9 |

*Primary Examiner*—Frank W. Lutter
*Assistant Examiner*—Roger F. Phillips
*Attorney, Agent, or Firm*—Becker & Becker, Inc.

[57] ABSTRACT

A method of reducing the sulfur content of coal, reduced to dust, by means of its own or external thermal energy and by means of rapid coking and/or rapid partial destructive distillation of the coal. The coal dust, which has been ground to less than 0.1 mm and, if necessary, preoxidized in 1 to 4 seconds at 350° to 450° C., is brought to a reaction temperature of 700° to 1100° C. This reaction temperature may be reached directly, either by means of carrier or heating gas heated to over 1000° C., or by means of the partial combustion of the coal with air or oxygen, at heating rates greater than 20,000° C./min. This reaction temperature may also be reached indirectly, at heating rates of less than 20,000° C./min, by means of gaseous, liquid, or turbulent heating carriers. The coal dust is allowed to stand for 1 to 6 seconds at a pressure of 1 to 15 bar until the coke dust and gas which are produced separate from one another. The time the coal dust is allowed to stand is selected in conformity with the $H_2S$ content in the resulting gas mixture at the end of this standing time, so that a shorter time is used if the $H_2S$ content, at normal pressure, exceeds 0.3% by volume.

1 Claim, No Drawings

METHOD OF REDUCING THE SULFUR CONTENT OF COAL REDUCED TO DUST

This is a continuation of application Ser. No. 866,479, filed Jan. 3, 1978, and now abandoned.

The present invention relates to a method of reducing the sulfur content of coal reduced to dust by means of its own or external thermal energy and by means of rapid coking and/or rapid destructive distillation of the coal.

To protect the environment, a series of official regulations have been issued, including the limitation of the discharge of sulfur dioxide ($SO_2$). Particularly affected by this limitation are the large plants in which gas, oil, or coal are burned, such as power plants which supply electricity, or steam generators in the industry for generating, for instance, steam for certain processes.

Gas, such as natural gas, has the lowest sulfur content since it is purified and thereby also desulfurized prior to being delivered to the distributing system. Light oils in general also have low sulfur contents. The heavy heating oils, on the other hand, have high sulfur contents, and proposals have already been presented for desulfurizing them. Thus, for example, it has been proposed to destructively distill the oil prior to combustion, and to desulfurize the destructive distillation gas, resulting therefrom, prior to combustion. This has the advantage that after the destructive distillation a smaller amount of gas need be desulfurized than after the combustion.

With power plants having coal firing equipment, on the other hand, efforts have up to now been confined to desulfurizing flue gas. For this purpose also, a series of methods have been developed or are still in the process of being developed. The drawback of these methods is, on the one hand, that the equipment necessary for desulfurization requires too great of an investment, so that the costs of generating electricity are increased by more than 20%. On the other hand, with most of these methods, calcium sulfate is generated, which can lead to further environmental problems. With the increasing number of such plants, the complete utilization of the calcium sulfate within the concerned industry, if even possible, becomes increasingly difficult. Eventually, one is forced to remove and store this calcium sulfate.

Flue gas desulfurization is a method which attempts to eliminate the result of a phenomenon, but not its cause. Generally, however, it is more expedient and economical to eliminate the cause and not the result. The cause of the phenomenon is the introduction of a more or less large portion of sulfur with the fuel into firing equipment, where the sulfur is converted with oxygen to sulfur dioxide and is conveyed with the flue gas into the atmosphere.

If one kilogram of coal is burned, the result, in general, is about 9 $m_n^3$ flue gas, which has to be desulfurized. It would be less expensive if one had a method which would make possible the desulfurization of the coal, prior to burning it, to such an extent that the sulfur residue remaining in the coal, during the subsequent burning, only leads to emission values which are below the limit. The sulfur in the coals exists in different combinations and amounts. In addition to the organic sulfur, the coal also contains sulfur in the form of pyrites, sulfites, and sulfates, each of which, at high temperatures, reacts differently, decomposes differently, or is converted with other constituents of the coal or of the oxidizing agent for the combustion. In this connection, even a reformation from the sulfur compounds which have resulted from the effect of temperature to pure sulfur, and its renewed accumulation in the coal or the combustion residue thereof, is possible.

The sulfur content of coals can reach several percent. For example, the average sulfur content of coal mined in the German Ruhr district is about 1.1%. For an extensive desulfurization, it is necessary to convert the sulfur of the coal into a form, such as a gaseous state, which allows, in a known purification method, the separation and conversion of sulfur-containing gas compounds in such a way that, for example, sulfuric acid can be recovered or also that only amorphous sulfur remains as end product. This solid sulfur, to the extent that it is not used within the concerned industry, can be removed or stored, for example in shut-down mines. The amount of this sulfur is volumetrically considerably less than, for example, the amount of calcium sulfate generated during desulfurization of flue gas.

For the extensive reduction of the sulfur in solid fuels, the use of temperature, under certain limiting conditions, is necessary. It is known that sulfur separates from fuel with the use of temperature. Since till now, however, it was not necessary to do so, no thought was given to the limiting conditions for an optimum desulfurization. It is, for example, known that during the chamber or by-product coking, 20 to 30% of the sulfur contained in the coal is carried off with the generated gas. During the chamber coking, a substantially stationary coal layer is very slowly heated up from the outside, at about 3°/minute and in 16 to 24 hours, to temperatures over 1000° C. By means of this thermal effect, the volatile constituents are separated out of the coal. These constituents must then diffuse through the coke yield, resulting from the coal charge, to the outlet. In this manner, by means of the hot coke with its corners, edges, etc., and by means of other effects, portions of the volatile constituents are again split up, such as tar and methane, but also the hydrogen sulfide. The composition of the volatile constituents defined at the outlet of the chamber coking thereby no longer corresponds to its original composition. With regard to the desulfurization of the coal, this would not be significant if the hydrogen sulfide, on its way through the coke layer, did not also decompose, thereby again adding sulfur, which was already taken out of the coal, to the coke. This explains why, during the chamber coking, the sulfur content of the generated coke is often nearly as high as that of the starting coal. Such a coke cannot, for example in the firing chamber of a steam generator, be burned alone, since it discharges practically the same amount of sulfur in the flue gas as would the coal.

Experiments in connection with the present invention have even shown that it is possible under certain conditions to again add the entire sulfur removed from the coal to the coke, so that the sulfur content thereof, due to the lesser weight of the coke, can have a considerably higher percentage than the sulfur content of the coal.

This leads to the conclusion that it would be useful, instead of generating lumpy coke, to generate coke dust from ground coal; to allow the separation of the volatile constituents from the coal dust to take place so fast that a decomposition of the hydrogen sulfide does not occur; and finally, to carry out a quick separation of generated coke dust and gas. Also to be considered is the fact that, during the combustion of one kg coal, as already mentioned, generally about 9 $m_n^3$ flue gas per kg coal results and has to be desulfurized. If, on the other hand, one only wanted to carry out a coking and, if desired, a partial destructive distillation, as is described in the present invention, only about 0.7 to 1.4 $m_n^3$ gas per kg coal would have to be purified from the sulfur compounds. It is also known to completely destructively distill coal, and to desulfurize the destructive distillation gas and then to burn this gas in place of the coal. Apart from the fact that during the destructive distillation, the capacity of the coal to cake causes difficulties, during the complete destructive distillation of the coal with air, from 1 kg carbon, about 5.4 $m_n^3$ destructive distillation gas still results; during destructive distillation with pure oxygen, about 1.9 $m_n^3$ results; and during the destructive distillation with steam, about 3.7 $m_n^3$ results. In this connection, the considerable cost of oxygen should not be overlooked. These amounts of gas are actually already considerably lower than the amounts of flue gas resulting during combustion, but this raises the question whether it is necessary within the power plant, for maintaining the emission standards, to completely destructively distill the solid fuel. Apart from other limiting conditions within the power plant (ability to uncouple gas and current generation, coupling the gas turbine and steam turbine processes, etc.), further considerations lead to the conclusion that for the adequate desulfurization of the coal, the coking and, if desired, also an additional partial destructive distillation suffice, according to which the degree of the partial destructive distillation, for instance 10–50%, represents the regulator for the sulfur introduced with the coke dust into the firing equipment. The gas to be burned in the gas turbine and/or in the steam generator and which is to be recovered from the coal by means of coking and partial destructive distillation is, of course, previously desulfurized. Depending upon the method of coking and partial destructive distillation, a quantity of gas is then produced and must be desulfurized, which quantity is considerably lower than those which are produced with the methods of complete destructive distillation.

It is an object of the present invention to present a method which makes it possible to desulfurize coal in an economical manner prior to combustion and to such an extent that the quantity of sulfur dioxide emitted, for example in a power plant, remains below the allowable limit, thereby making a flue gas desulfurization superfluous.

The method pursuant to the present invention for reducing the sulfur content of coal, which has been reduced to dust and, if necessary, pre-oxidized, by means of its own or external thermal energy and by means of rapid coking and/or rapid partial destructive distillation of the coal, is characterized primarily in that the coal dust, which has been ground to less than 0.1 mm and, if necessary, pre-oxidized in one to four seconds at 350° to 450° C., is brought to a reaction temperature of 700° to 1100° C. either directly, by means of heating or carrier gas heated to over 1000° C. or by means of the partial combustion of the coal with air or oxygen at heating rates greater than 20,000° C./min., or indirectly, at heating rates of less than 20,000° C./min., by means of heating carriers which are gaseous, liquid, or in a turbulent state. The method of the present invention is further characterized in that the coal dust is left for one to six seconds at a pressure of one to 15 bar until separation of the coke dust and gas. In addition, while exceeding (under normal pressure) a hydrogen sulfide content of 0.3% by volume in the mixing gas (the coking and/or partial destructive distillation gas and, as the case may be, heating or carrier gas) at the end of the reaction chamber, the holding time in the reaction chamber is shortened.

The drying of the coal is carried out simultaneously with the grinding thereof, for example by fine grinding. The grain fineness can correspond to that normally used with the combustion of coal dust, but can also be finer. In all cases, the grain portions over 0.1 mm are separated out of the grain quantities and are returned to the grinder for further grinding. A preoxidation of the coal dust with oxygen-containing gases at temperatures of 350° to 450° C. in one to four seconds can follow the grinding. The coking and/or partial destructive distillation then follows the preoxidation. With the use of the temperature and, if necessary, pressure in the reaction chamber for coking and partial destructive distillation at the heating rates used there, a coke granule is generated the inner and outer surfaces of which are considerably more than 10 times as large as those of the original coal dust granule. In this way, the coke granule becomes unusually reactive, for instance for the combustion or also for the destructive distillation of the coke dust. Furthermore, constituents contained in the coke granule, for example the sulfur, are much more accessible to those participants in the reaction having a greater affinity for sulfur than is the case in the coal granule. A particularly high affinity is exhibited by hydrogen formed from the coal during the coking as well as during the partial destructive distillation with steam in the nascent state.

By means of the water formed during the coking, the moisture carried along by the coal, as well as the partial combustion of heating gas or coal, a quantity of steam is formed which alone already, in certain circumstances, effects an adequate partial destructive distillation of the solid coke dust.

The quantity of heat required to directly heat up the coal dust from the entry temperature to the reaction temperature can, pursuant to the present invention, be taken from a heating gas which has been brought to an appropriately high temperature, for instance 1200°–1600° C., by preheating and, if necessary, partial combustion. For this purpose, a portion of the gas resulting during the coking and/or partial destructive distillation can be conveyed into the cycle, or heating gases can be used which originate from an external energy source, for example, from a gas system for natural gas, coke-oven or coal gas, blast furnace gas, etc., which, likewise by means of preheating or also by the heat from nuclear power and, if necessary, partial combustion, are brought to an appropriately high temperature level.

Pursuant to a further feature of the present invention, it is therefore proposed that, with direct heat supply from heating gas, the coal dust is axially blown in in a stream at such a rate, and the heating gas, at the same level, is tangentially introduced through at least two openings arranged over the periphery of the reaction chamber at an angle of 10° to 30°, preferably 15°, to the horizontal and in the direction of the coal stream, at such a rate, that the dust granules contact the wall of the reaction chamber only after traveling about 1.5 m.

As a further possibility of the direct heat supply, pursuant to the present invention, a portion of the coal dust introduced into the reaction chamber is burned immediately, and with the thereby resulting heat, the remaining portion of the coal dust is brought to the reaction temperature. With this direct heat supply by means of the partial combustion of the coal dust, the coal dust is axially blown in in a stream with a smaller portion of the oxidizing agent, such as air or also oxygen. The larger portion of the oxidizing agent is axially introduced in such a spin or twist that the dust granules contact the wall of the reaction chamber only after traveling about 1.5 m.

For an indirect heat supply it is finally proposed pursuant to the present invention to transfer the heat to the coal dust-carrier mixture from gaseous, liquid, or turbulent heat carriers by means of heating surfaces. In this connection, these heating surfaces may, for example, be designed as tubes, pockets, etc., and the coal dust-carrier gas mixture, for example with tube heating surfaces, can flow not only through the tubes (the heat carrier then flows around the tubes), but also around the tubes; in the last case, the heat carrier flows through the tubes.

Common to all of these variations of the method, is the optimum reaction temperature, which is adjusted in conformity with the type of coal, the treatment time, and the separation of the resulting coke dust from gas. Temperatures between 700° and 1100° C. are utilized for the optimum desulfurization. For a specific type of coal, a certain temperature gives the optimum results. For example, to desulfurize one type of coal an optimum temperature might be in the range of 800°–850° C., while for another type of coal, such an optimum temperature might be 900°–950° C. For the bituminous coal from the Ruhr district, the optimum temperature range is between 750°–950° C. At these temperatures, under normal pressure, desulfurization rates of up to 70% result merely from the coking process, i.e., 70% of the sulfur originally contained in the coal dust is converted into a gaseous state. The absolute sulfur content in the coke dust then equals only about 50% of the sulfur content of the coal.

The treatment time is closely related to the hydrogen sulfide content of the heating or carrier gas. The higher this hydrogen sulfide content, the shorter should be the treatment time of the dust, in order to avoid the reverse decomposition of the hydrogen sulfide. Experiments have shown that above 0.3% by volume of hydrogen sulfide in the heating or carrier gas, already with processes which took place in seconds, a reverse decomposition of the hydrogen sulfide to hydrogen and sulfur resulted. This reverse decomposition with hydrogen sulfide contents greater than 0.6% by volume is already very pronounced. With hydrogen sulfide volume contents of, for example, greater than 3%, a coke dust is generated which has a sulfur content about ⅓ greater than the entering coal dust. From this it is clear that the separation of coke dust and generated gas must be accomplished as quickly as possible.

With increasing hydrogen sulfide content in the gas at the exit from the reaction chamber, the holding or staying time in the reaction chamber should be shortened; for instance, with 1% by volume hydrogen sulfide in the gas, to, for example, two seconds.

On the other hand, to prepare the coal dust for the actual desulfurization, certain times must be maintained during the coking and/or partial destructive distillation processes in order to adequately break or open up the granule. Semi-coke, that is, a coal dust granule which has been coked to about 10% residual volatile constituents, is not yet as accessible to the hydrogen for desulfurization as is a coke granule which has been coked to 1–2% residual volatile constituents. This degree of coking is achieved at temperatures of about 900° C. in two or three seconds, at about 1000° C. in approximately 1.5 seconds. Pursuant to the present invention, this leads to coking temperatures which are preferably in the range of 850°–1000° C., for the partial step of the partial destructive distillation at 1000° C. and more; to treatment times of preferably between two and four seconds; and to heating gas or carrier gas quantities having hydrogen sulfide volume contents at the end of the reaction chamber of, to as great an extent as possible less than 0.3% by volume.

To improve the gas quality in relation to the pure air destructive distillation as well as also with the oxygen destructive distillation for generating synthesis gas and also for increasing the hydrogen content in the generated gas to improve the desulfurization effect, it is further proposed, for the partial destructive distillation, to additionally introduce highly heated steam into the reaction chamber no later than 2 minutes after the entry of the coal dust.

Pursuant to a further feature of the present invention, if desired, hydrogen or hydrogen containing gases can still be additionally supplied to the heating or carrier gas in case the amount of hydrogen carried with the heating gas or the carrier gas and/or given off by the coal is insufficient for the aimed at desulfurization process. The hydrogen content should, as much as possible, be at least 5% by volume, preferably greater than 10%.

With the integration of this operation cycle into the total power plant process, a gas purification system follows the coking and/or partial destructive distillation apparatus. In this gas purification system, the sulfur compounds are removed from the generated gas and, for example in a succeeding Claus plant, are converted to amorphous sulfur. From the purified gas, if desired, a portion is returned as heating gas to the reaction chamber of the coking and/or partial destructive distillation; the other portion goes as fuel to the gas turbine and, with an appropriate excess, goes directly to the steam generator in the event that no other customer is available for the generated gas.

If the generated gas is only used within the power plant itself as fuel, the heating value of this gas need only be high enough that its combustion is assured. In this case, air is used as the oxidizing agent during the partial combustion of the heating gas or the coal to cover the heat requirement within the reaction chamber. However, if, for example, synthesis gas is to be given off toward the outside from the power plant, oxygen or oxygen enriched air is used in place of the air.

The amount of gas purified of sulfur and going through the gas turbine or immediately into the steam generator can, if desired, be varied by the degree of the partial destructive distillation in such a way that the amount of sulfur dioxide, which is in the flue gas and which is produced by burning the coke dust which still contains sulfur, satisfies the regulations for keeping the air clean.

The advantages associated with the present invention are as follows:

1. Extensive desulfurization of the coal dust prior to its being burned;

2. High reactivity of the coke dust for the destructive distillation as well as for the combustion;

3. Variable partial destructive distillation for regulating the amount of sulfur introduced into the steam generator; and 4. Conversion of the sulfur removed from the coal, through a gaseous state and in the gas purification, to amorphous, storable, and, if desired, salable sulfur or other sulfur products.

It is, of course, to be understood that the present invention is in no way limited to the specific disclosure of the specification, but encompasses any modifications within the scope of the appended claims.

What I claim is:

1. The method for desulfurizing coal, comprising:
   (a) grinding coal and screening to coal dust of particle size of less than 0.1 mm in diameter;
   (b) preoxidizing said coal dust with oxygen-containing gas for a period of one to four seconds and at a temperature of 350° to 450° C.;
   (c) introducing the preoxidized coal dust granules axially into a reaction chamber with a carrier gas; and
   (d) treating said coal dust granules for a period of from one to six seconds while raising the temperature thereof to a range of 700° to 1100° C. by introducing heated hydrogen containing gas containing no more than 0.3% hydrogen sulfide into said chamber tangentially from at least two locations on the periphery of said reaction chamber and in the direction of flow of said coal dust to produce desulfurized coke granules ten times the original size of the coal dust particles fed.

* * * * *